United States Patent
Wolf et al.

(10) Patent No.: US 10,488,183 B1
(45) Date of Patent: Nov. 26, 2019

(54) SENSOR SYSTEM FOR INDIRECT SENSING OF DEFORMATION OF FLEXIBLE STRUCTURES

(71) Applicant: United States of America as Represented by the Administrator of NASA, Washington, DC (US)

(72) Inventors: Michael G. Wolf, Orlando, FL (US); Jeffrey D. Suhey, Jacksonville, FL (US); James E. Stanley, Meritt Island, FL (US); Edwin D. Griffin, Meritt Island, FL (US); Hector Gutierrez, Melbourne Bearch, FL (US); Daniel Kirk, Indialantic, FL (US); Gabriel Lapilli, Houston, TX (US); Weihua Su, Tuscaloosa, AL (US); Natsuki Tsushima, Tokyo (JP); Bartel van der Veek, Eindhoven (NL)

(73) Assignee: United States of America as Represented by the Administrator of NASA, Washington, DC (US)

( * ) Notice: Subject to any disclaimer, the term of this patent is extended or adjusted under 35 U.S.C. 154(b) by 171 days.

(21) Appl. No.: 15/852,059

(22) Filed: Dec. 22, 2017

Related U.S. Application Data (60) Provisional application No. 62/440,441, filed on Dec. 30, 2016.

(51) Int. Cl.
*G01B 11/16* (2006.01)
*G01L 1/24* (2006.01)
(52) U.S. Cl.
CPC .............. *G01B 11/18* (2013.01); *G01L 1/242* (2013.01)

(58) Field of Classification Search
CPC .................................. G01B 11/18; G01L 1/242
See application file for complete search history.

(56) References Cited

U.S. PATENT DOCUMENTS

| 7,520,176 B1* | 4/2009 | Ko ....................... G01M 5/0016 |
| | | 73/794 |
| 7,538,860 B2* | 5/2009 | Moore ............... G02B 6/02076 |
| | | 356/35.5 |

(Continued)

FOREIGN PATENT DOCUMENTS

WO    WO 2017/030648      2/2017

OTHER PUBLICATIONS

Jiang, et al., "Real-Time Estimation of Time-Varying Bending Modes Using Fiber Bragg Grating Sensor Arrays," AIAA Journal, vol. 51, No. 1 (2013), pp. 178-185.

(Continued)

*Primary Examiner* — Freddie Kirkland, III
(74) *Attorney, Agent, or Firm* — Jonathan J. Leahy; Mark W. Homer (57) ABSTRACT

A sensor system for sensing deformation of a flexible structure includes a beam structure that will be coupled to a surface of the flexible structure having a natural frequency $f_s$, an axial strain $\varepsilon_{axial}^{structure}$, and a shear strain $\varepsilon_{xy}^{structure}$ associated therewith. The beam structure has an axial strain $\varepsilon_{axial}^{beam}$ and a shear strain $\varepsilon_{xy}^{beam}$ associated therewith. The beam structure satisfies criteria defined by minimization of a root mean square difference between $\varepsilon_{axial}^{structure}$ and $\varepsilon_{axial}^{beam}$ and minimization of a root mean square difference between $\varepsilon_{xy}^{structure}$ and $\varepsilon_{xy}^{beam}$. Fiber optic strain sensors are coupled to and distributed in a spaced-apart fashion along the beam structure. The beam structure is more flexible than the flexible structure such that a combination of the beam (Continued)

structure, the fiber optic sensors, and the flexible structure has a natural frequency $f_c$ defined by $(0.95)f_s \leq f_c \leq (1.05)f_s$.

33 Claims, 3 Drawing Sheets

(56) References Cited

U.S. PATENT DOCUMENTS

| | | | | |
|---|---|---|---|---|
| 7,715,994 | B1* | 5/2010 | Richards | G01M 5/0016 |
| | | | | 702/42 |
| 7,732,998 | B2* | 6/2010 | Allison | G02B 6/022 |
| | | | | 310/365 |
| 7,813,599 | B2* | 10/2010 | Moore | G01B 11/18 |
| | | | | 385/12 |
| 8,700,358 | B1* | 4/2014 | Parker, Jr. | G01D 5/35316 |
| | | | | 250/227.14 |
| 8,746,076 | B2* | 6/2014 | Rogge | G01L 1/246 |
| | | | | 385/12 |
| 8,909,040 | B1* | 12/2014 | Parker, Jr. | G02B 6/35 |
| | | | | 398/25 |
| 9,032,810 | B2* | 5/2015 | Ravet | G01B 11/18 |
| | | | | 73/800 |
| 9,274,181 | B1* | 3/2016 | Carman | G01R 33/032 |
| 9,664,506 | B2* | 5/2017 | Parker, Jr. | G01B 11/165 |
| 2009/0217769 | A1* | 9/2009 | Roberts | G01B 11/18 |
| | | | | 73/800 |

OTHER PUBLICATIONS

Van Der Veek, Bartel J., "Vibration Control of a Flexible Rocket using FBG Sensor Array," Graduate Degree Dissertation, (2013) pp. 1-227.

Jiang, et al., "Modal Estimation by FBG for Flexible Structures Attitude Control," IEEE Transactions on Aerospace and Electronic Systems, vol. 50, No. 4 (2014), pp. 2642-2653.

Su, et al. "Dynamic Beam Solutions for Real-Time Simulation and Control Development of Flexible Rockets," Journal of Spacecraft and Rockets, vol. 54, No. 2 (2017), pp. 403-416.

* cited by examiner

SENSOR SYSTEM FOR INDIRECT SENSING OF DEFORMATION OF FLEXIBLE STRUCTURES

Pursuant to 35 U.S.C. § 119, this patent application claims the benefit of and priority to U.S. Provisional Patent Application Ser. No. 62/440,441, filed Dec. 30, 2016, the contents of which are hereby incorporated by reference in their entirety.

ORIGIN OF THE INVENTION

The invention described herein was made in the performance of work under a NASA contract and by employees of the United States Government and is subject to the provisions of Public Law 96-517 (35 U.S.C. § 202) and Section 20135(b) of the National Aeronautics and Space Act, Public Law 111-314, § 3 (124 Stat. 3330, 51 U.S.C. Chapter 201) and may be manufactured and used by or for the Government for governmental purposes without the payment of any royalties thereon or therefore.

BACKGROUND OF THE INVENTION

1. Field of the Invention

This invention relates to structural deformation monitoring. More specifically, the invention is a sensor system that indirectly senses deformation of flexible structures.

2. Description of the Related Art

In current launch vehicle attitude control systems, initial measurement units (IMUs) are used to measure a rocket's rigid-body kinematics. However, the use of IMU data is limited when it comes to monitoring the deformation of flexible rocket bodies which must be considered in the attitude control of a rocket. Bending and vibration deformation can be measured using fiber optic sensors installed on a rocket's surface. However, such installations are inconvenient since they introduce substantial design and construction issues impacting structural integrity, construction complexity, and cost associated with a launch vehicle.

SUMMARY OF THE INVENTION

Accordingly, it is an object of the present invention to provide a system for sensing deformation of flexible structures.

Another object of the present invention is to provide a system for sensing deformation of flexible rockets.

Other objects and advantages of the present invention will become more obvious hereinafter in the specification and drawings.

In accordance with the present invention, a sensor system for sensing deformation of a flexible structure includes a beam structure adapted to be fixed to a surface of the flexible structure. The flexible structure has a natural frequency $f_s$, an axial strain $\varepsilon_{axial}^{structure}$, and a shear strain $\varepsilon_{xy}^{structure}$ associated therewith. The beam structure has an axial strain $\varepsilon_{axial}^{beam}$ and a shear strain $\varepsilon_{xy}^{beam}$ associated therewith. The beam structure satisfies a criteria defined by minimization of a root mean square (RMS) difference between $\varepsilon_{axial}^{structure}$ and $\varepsilon_{axial}^{beam}$ and minimization of an RMS difference between $\varepsilon_{xy}^{structure}$ and $\varepsilon_{xy}^{beam}$. A plurality of fiber optic strain sensors are coupled to and distributed in a spaced-apart fashion along the beam structure. The beam structure is more flexible than the flexible structure such that a combination of the beam structure, the fiber optic sensors, and the flexible structure has a natural frequency $f_c$ defined by $(0.95)f_s \leq f_c \leq (1.05)f_s$.

BRIEF DESCRIPTION OF THE DRAWING(S)

Other objects, features, and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

The sensor system of the present invention can be used to sense deformation of a variety of static and mobile structures to include buildings, bridges, crane booms, aircraft, rockets, etc. By way of an illustrative example, the present invention will be described for its use with a rocket whose components define a long cylindrical object subject to deformation during launch and flight. As used herein, the term deformation includes bending deformation, vibration-induced deformation, and torsional or twist deformation. The sensor system of the present invention can be configured to sense one or more of these types of deformations.

Figure 1:
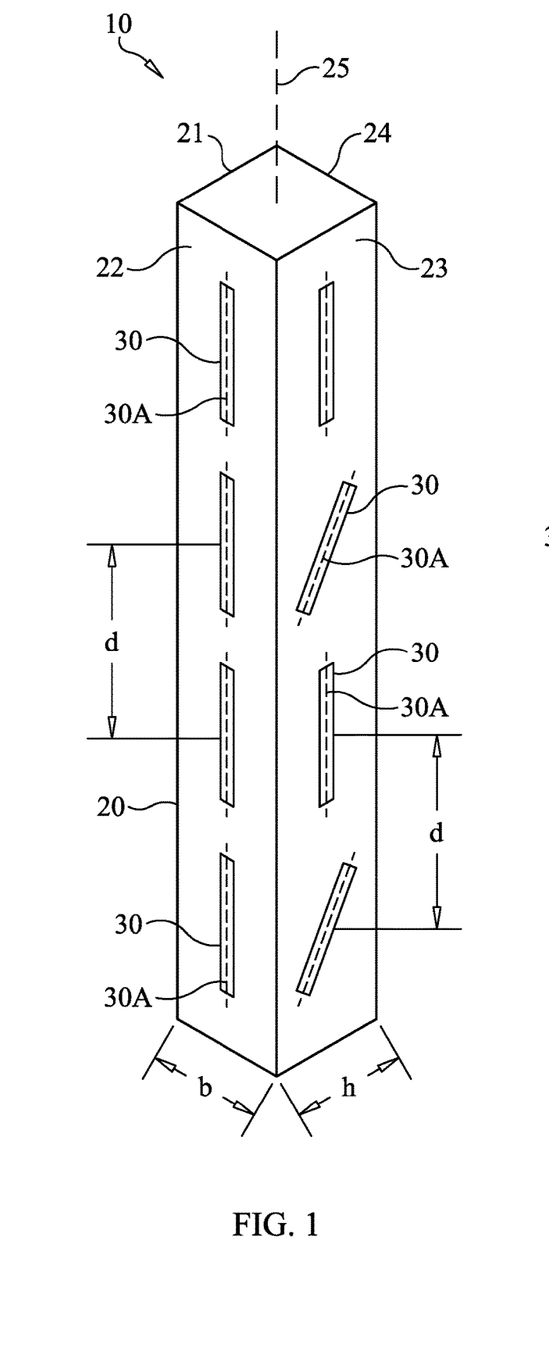
FIG. 1 is a perspective view of a flexible-body fiber optic sensor system for sensing deformation of a flexible structure using a rectangular beam in accordance with an embodiment of the present invention.

Referring now to the drawings and more particularly to FIG. 1, a flexible-body fiber optic sensor (or "FlexFOS") system in accordance with an embodiment of the present invention is shown and is referenced generally by numeral 10. As will be explained below, sensor system 10 defines a multi-axial reference strain structure that can be used to monitor bending and torsion vibrations/deformations in flexible structures. Sensing system 10 includes a beam structure 20 and a plurality of spaced-apart fiber optic sensors 30 affixed to beam structure 20, (e.g., on surfaces of beam structure 20). For simplicity and clarity of illustration, wiring to and/or between sensors 30 has been omitted from the figures as well as any sensor data collection and processing system(s).

Beam structure 20 can be solid or hollow without departing from the scope of the present invention. In all cases, beam structure 20 must be much more flexible than the structure to which it will be coupled. In general, the flexibility of beam structure 20 should be such that it does not significantly influence the behavior, deflection, or frequency of the flexible structure to which beam structure 20 is coupled. Since there are several flexibility attributes of concern (e.g., bending, axial, torsional, etc.), beam structure 20 must be flexible enough to not change the natural frequency of the combination of the flexible structure being monitored and sensor system 10 (or a plurality of sensor systems 10) by more than 5%. That is, if the natural frequency of the flexible structure to be monitored is $f_s$ and the natural frequency of the combination of the flexible structure and sensor system(s) 10 is $f_c$, the mathematical constraint governing the flexibility of beam structure 20 can be written as $(0.95)f_s \leq f_c \leq (1.05)f_s$.

Each of sensors 30 can be a fiber optic sensor, such as a commercially-available Fiber Bragg Grating (FBG) sensor. The fixing of sensors 30 to beam structure 20 can be accomplished in a variety of ways known in the art without departing from the scope of the present invention.

For the illustrated sensor system 10, beam structure 20 is rectangular and uniform in cross-section along its length such that four longitudinally-extending planar surfaces or faces 21-24 are defined. To accommodate the coupling of beam structure 20 to a structure (not shown in FIG. 1) that is to be monitored for deformation, one of faces 21-24 does not have any sensors 30 coupled thereto. In the illustrated embodiment, face 24 has no sensors 30 affixed thereto, while each of faces 21-23 has an array of spaced-apart sensors 30 distributed along the length of the respective faces 21-23. More specifically, for each of faces 21-23, sensors 30 are arranged and distributed along a line that is parallel to the longitudinal axis 25 of beam structure 20. The number of sensors used on beam structure 20 is not a limitation of the present invention.

Assuming each sensor 30 has an axis of sensitivity or sensing axis 30A, the sensors associated with a face of beam structure 20 can be oriented to be sensitive to certain types of deformation. For example, all of sensors 30 on face 22 have their sensing axes 30A aligned along a line that is parallel to longitudinal axis 25 of beam structure 20. As will be explained further below, the resulting array of sensing-axis-aligned sensors 30 on face 22 is sensitive to all deflections of beam structure 20 except for torsion.

Sensors 30 on each of opposing faces 21 and 23 are also arranged in a linear array along a line that is parallel to longitudinal axis 25 of beam structure 20. However, sensing axes 30A for sensors 30 on each of faces 21 (not visible in FIG. 1) and 23 alternate in orientation relative to longitudinal axis 25. For example, for each of faces 21 and 23, those of sensors 30 having their sensing axes 30A parallel to longitudinal axis 25 are interleaved with a remainder of sensors 30 having their sensing axes 30A oriented at an acute angle (e.g., 45o) relative to longitudinal axis 25. As will be explained further below, the resulting arrays of sensors 30 on faces 21 and 23 are sensitive to all deformations inclusive of torsion deformation. It is to be understood that, depending on the application, all sensors coupled to a beam could be as shown on face 22 or all sensors could be as shown on face 23 without departing from the scope of the present invention.

Figure 2:
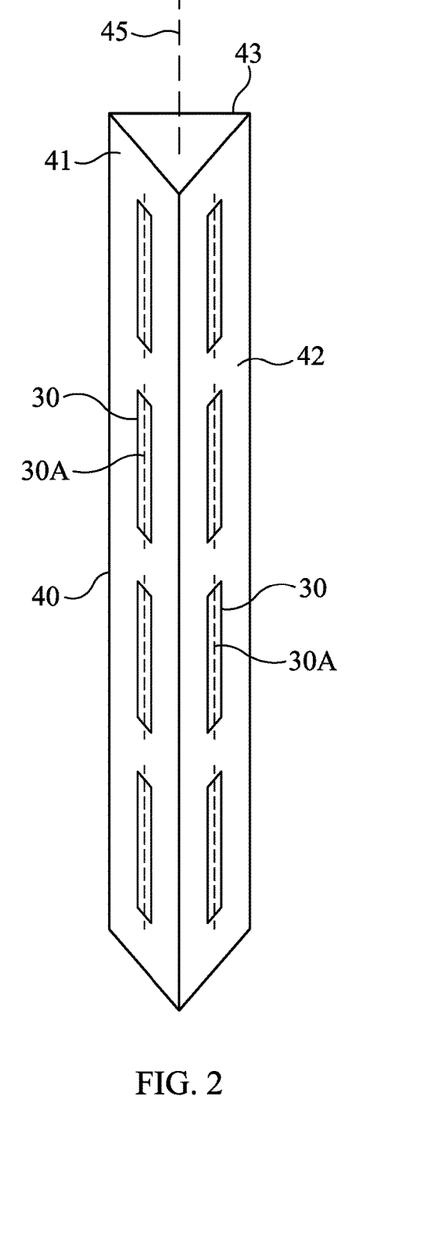
FIG. 2 is a perspective view of a flexible-body fiber optic sensor system for sensing deformation of a flexible structure using a triangular beam in accordance with another embodiment of the present invention.

The present invention is not limited to the use of rectangular beams. For example, FIG. 2 illustrates a triangular beam structure 40 having longitudinally-extending faces 41-43. For beam structure 40, face 43 has no sensors 30 affixed thereto to provide for attachment of beam structure 40 to a structure (not shown in FIG. 2). Each of faces 41 and 42 has sensors 30 affixed thereto in one or more orientations as described previously above, e.g., all sensing axes 30A aligned along lines parallel to the longitudinal axis 45 of beam structure 40.

Figure 3:
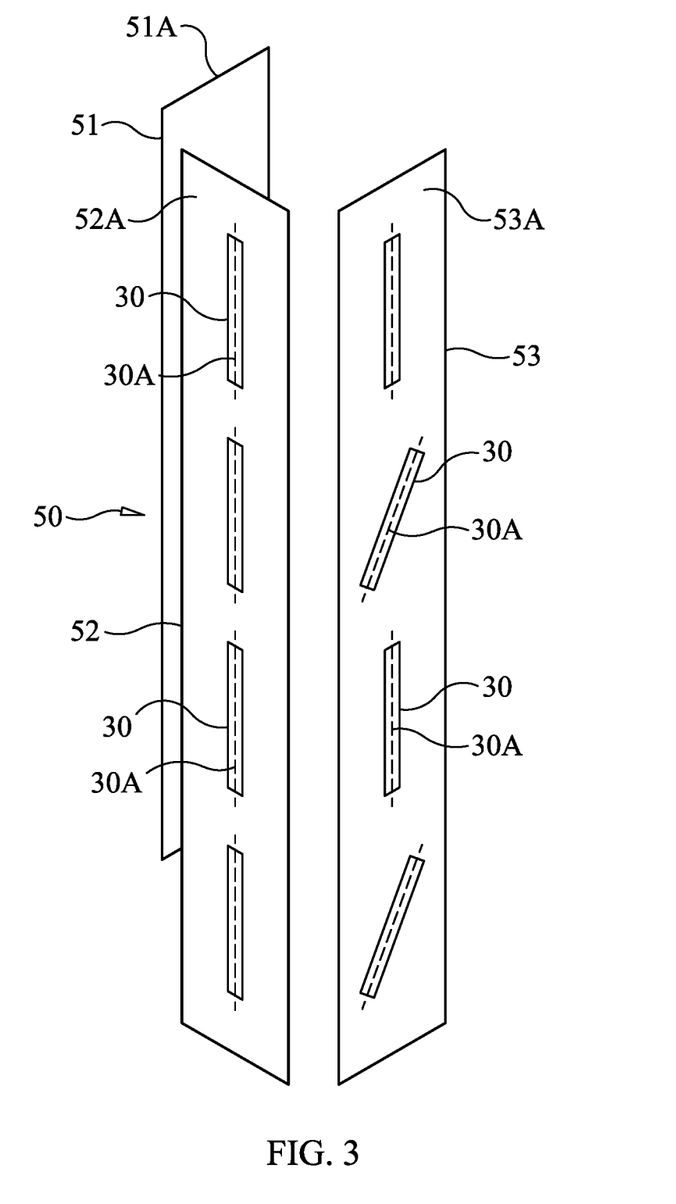
FIG. 3 is a perspective view of a flexible-body fiber optic sensor system for sensing deformation of a flexible structure using three flat beams in accordance with another embodiment of the present invention.

A beam structure in the present invention could also be constructed using a plurality of flat beams arranged for measurement of one or more deformations of interest. For example, FIG. 3 illustrates a beam structure 50 defined by three flat plates 51-53 positioned with their respective faces 51A-53A being analogous to the above-described faces 21-23 associated with beam structure 20. Sensors 30, each with a sensing axis 30A, can be arranged on each of faces 51A-53A in any of the ways previously-described herein.

By way of an illustrative example, a plurality of sensor systems as described above can be coupled to a flexible cylindrical structure such as a rocket as will now be explained with additional reference to FIGS. 4 and 5 where a segment of a rocket body 100 has three rectangular-beam sensor systems 10 of the present invention coupled to an outside surface 102 of rocket body 100. Each sensor system 10 is fixedly coupled to one or more rigid links or mounts 60 that, in turn, are rigidly coupled to rocket body 100 at surface 102. As a result, each sensor system 10 is offset from surface 102 of rocket body 100 by a spacing "r". The particular design of mounts 60 and the way they are coupled to rocket body 100 and beam structures 20 are not limitations of the present invention.

Figure 4:
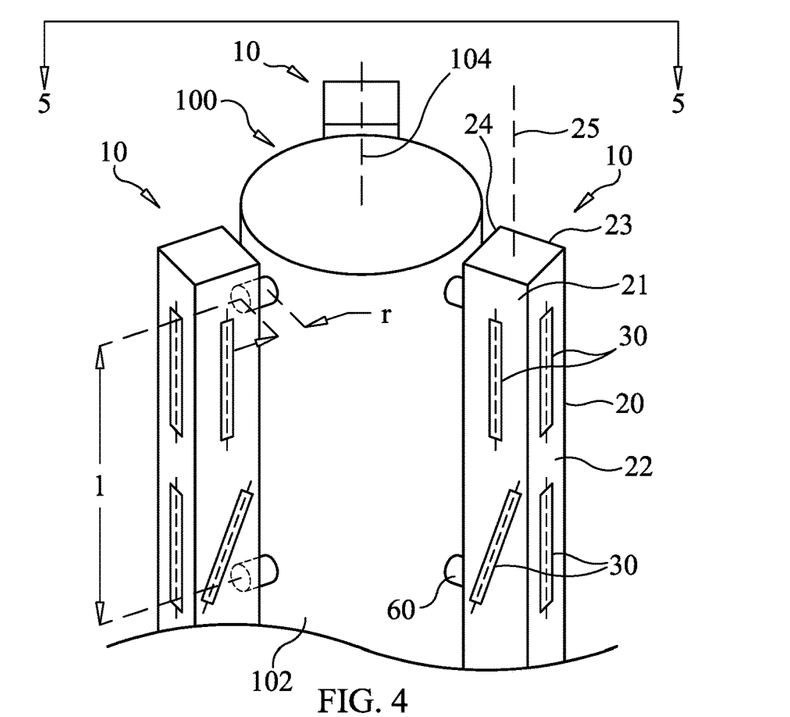
FIG. 4 is a perspective view of a segment of a flexible cylindrical structure with three flexible-body fiber optic sensor systems coupled thereto in accordance with an embodiment of the present invention.
Figure 5:
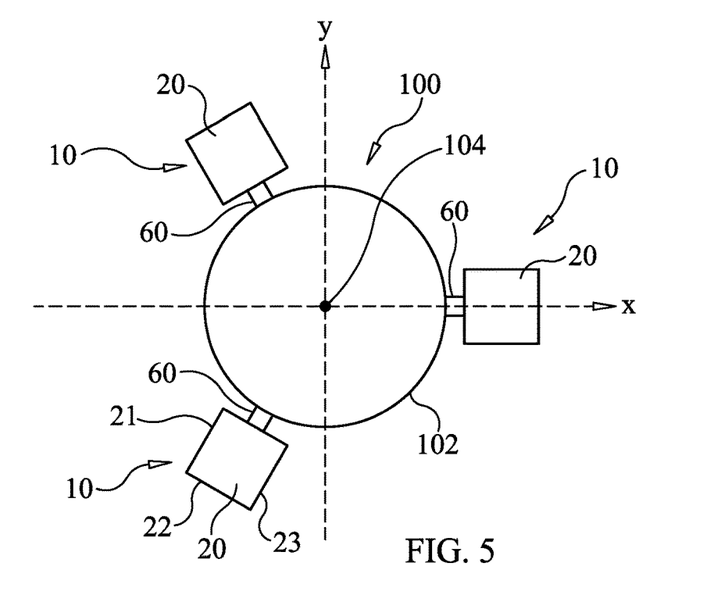
FIG. 5 is an axial view of the cylindrical structure and the three rectangular-beam sensing systems taken along the 5-5 in FIG. 4.

As shown in FIG. 4, three sensor systems 10 are attached to the outer surface 102 of rocket body 100 along the rocket's longitudinal length using rigid links or mounts 60. Only the cylindrical portion of rocket body 100 is illustrated as this is the portion that will be instrumented with and monitored by the sensor system of the present invention. The three sensor systems 10 are separated from each other by 120° about the circumference of rocket body 100. Each beam structure 20 runs along the length of the cylindrical portion of rocket body 100. Each sensor system's beam structure 20 has a uniform rectangular cross-section, although other cross-sectional shapes can be used without departing from the scope of the present invention. Strain sensors 30 are instrumented on beam structures 20 as described above to indirectly monitor the deformation of the rocket's surface 102.

Attributes of beam structure 20 and the spacing of sensors 30 that provide for accurate sensing of deformation of rocket body 100 will now be described with continued reference to FIGS. 1, 4, and 5. For the illustrated embodiment, the following five design parameters are used in the design of sensor systems 10:

the longitudinal spacing "l" of mounts 60 between rocket body 100 and beam structure 20;
the radial spacing "r" between rocket body 100 and beam structure 20;
the thickness "h" (see FIG. 1) of beam structure 20;
the width "b" (see FIG. 1) of beam structure 20; and
the sensor spacing "d" (see FIG. 1) along beam structure 20.

Kinematic equations are used to estimate the bending deflection of flexible rocket body 100 along its center axis 104 by using the measured strains from the three sensor systems 10. An optimization scheme is incorporated into the design of sensor system 10 that allows sensor systems 10 to obtain the most accurate information.

Beam structures 20 serve as the medium between rocket body 100 and strain sensors 30 that provides for the indirect measurement of structural deformation. Even if the indirect measurement of structural deformation through the beams is accurate, a kinematic relation is needed so that the deflection of the rocket's center axis 104 can be derived from the strains of rocket surface 102 measured by sensors 30. The kinematics are also helpful in the further development of real-time control algorithms for a rocket. As a first step, the bending/torsional curvatures of the rocket's center axis 104 are derived from the measured strain data. The resulting discontinuous curvatures along the rocket's center axis 104 are then used to approximate the deflection at any location along center axis 104.

The kinematic equations are applied to obtain the bending curvatures of the rocket's center axis 104 about the x and y directions according to the strains measured at the three beam structures 20 arranged with a 120° angular spacing around the circumference of rocket body 100. FIG. 5 shows the circumferential positions of the three beam structures 20 around rocket body 100.

For purpose of explaining the kinematic equations, it will be assumed that sensors 30 are placed on the three faces (21, 22, and 23) of each of beam structures 20 at alternating 0° and 45° orientations. An initial data processing is performed to interpolate the strain data measured by the 0° orientation sensors in order to compensate for the unavailable measurement data where sensors are placed at 45° as well as additional desired locations. For example, for a sensor 30 orientated at 45°, one has to interpolate the measurement data at adjacent 0° orientation sensors in order to obtain the 0° strain at the 45° sensor. The interpolated strain data of 0° and 45° at a given longitudinal location are denoted as $\varepsilon_0$ and $\varepsilon_{45}$, respectively, which determine the shear strain $$\varepsilon_s = \varepsilon_{45} - \frac{1-v}{2}\varepsilon_0 \tag{1}$$

where v is the bending deflection (e.g., in meters) along the y-direction. The shear strain at center axis 104 at that longitudinal location is obtained by averaging the data of the three beam structures 20 as follows:

$$\varepsilon_s^{ref} = \frac{1}{3}(\varepsilon_s^A + \varepsilon_s^B + \varepsilon_s^C) \tag{2}$$

where each of the superscripts A, B, and C denotes one of the three beam structures 20. Similarly, the normal strain (positive compressive) $\varepsilon_0^{ref}$ of the reference axis is $$\varepsilon_0^{ref} = \frac{\varepsilon_0^M - \varepsilon_0^C \cos\theta}{1-\cos\theta}, \tag{3}$$

$$\varepsilon_0^M = \frac{1}{2}(\varepsilon_0^A + \varepsilon_0^B)$$

where $\varepsilon_0^M$ is the normal strain at point M as the middle between the "A" and "B" locations of beam structures 20. Strains $\varepsilon_{BX}$ and $\varepsilon_{BY}$ related to bending in the x and y axes, respectively, are $$\varepsilon_B^Y = \varepsilon_0^{ref} - \varepsilon_0^C,$$

$$\varepsilon_{BX} = \varepsilon_0^B - \varepsilon_0^M \tag{4}$$

Finally, the curvatures of center axis 104 about each direction can be obtained by multiplying the corresponding sensitivities $S_{BX}$, $S_{BY}$, and $S_\theta$, given as $$\kappa_x = \frac{\varepsilon_{BX}}{S_{BX}}, \tag{5}$$

$$\kappa_y = \frac{\varepsilon_{BY}}{S_{BY}},$$

$$\kappa_z = \frac{\varepsilon_s^{ref}}{S_\theta}$$

These sensitivities consist of structural properties of the rocket and dominant deformation mode (especially in dynamic cases). It is convenient to calibrate them from experiments or finite-element analysis in case of very complicated structures such as rockets by observing both the strains and curvatures.

The bending curvatures along center axis 104 derived above are based on discontinuous data corresponding to where the interpolation is performed. A further calculation can be performed to recover the bending deflection at any location along center axis 104 from the discontinuous curvature data. At any time, the bending deflection of rocket body 100 can be expressed as the combination of its linear normal modes weighted by their magnitudes, which is $$u(z,t) = \sum_{j=1}^{\infty} \varphi_{uj}(z)\eta_{uj}(t) = \Phi_u\eta_u, \tag{6}$$

$$v(z,t) = \sum_{j=1}^{\infty} \varphi_{vj}(z)\eta_{vj}(t) = \Phi_v\eta_v$$

where u and v are the bending deflections in the x and y directions, $\Phi_u$ and $\Phi_v$ are the linear bending normal modes of the rocket in the x and y directions, and $\eta_u$ and $\eta_v$ are the corresponding modal coordinates. The modes are calculated from a finite-element analysis of the full rocket model, with the discrete modal information of center axis 104 extracted. In order to obtain the deflections at any point along center axis 104, one can use the shifted Legendre polynomials to approximate the discrete modes, given as $$\Phi_u(z_0) = P(z_0)A_u,$$

$$\Phi_v(z_0) = P(z_0)A_v \tag{7}$$

where $z_0$ are the discrete locations accounted in the center line bending modes. P is a matrix consisting of column vectors of individual shifted Legendre polynomials evaluated at $z_0$, while the number of involved polynomials (i.e., number of columns for P) is yet to be further determined. Since the mode shapes and values of Legendre polynomials are all known, the coefficient matrices $A_u$ and $A_v$ are obtained by $$A_u = P(z_0)^{-1}\Phi_u(z_0),$$

$$A_v = P(z_0)^{-1}\Phi_v(z_0) \tag{8}$$

Note that the P matrix is generally not invertible. Therefore, the known Moore-Penrose pseudo-inverse method can be used in the calculation. Finally, with the approximated mode shapes, the nodal displacements can be expressed as $$u(z,t) = P(z)A_u\eta_u(t),$$

$$v(z,t) = P(z)A_u\eta_u(t) \tag{9}$$

With known bending curvatures, one can solve for the modal coordinate magnitudes using derivatives of the Legendre polynomials, such that $$\eta_u(t) = P''(z)A_u)^{-1}\kappa_y(z,t),$$

$$\eta_v(t) = P''(z)A_v)^{-1}\kappa_y(z,t) \quad (10)$$

The approach avoids the spatial integration of the bending curvatures in order to obtain the bending deflections of the rocket's center axis 104.

The above-described kinematic equations assume that sensors 30 can accurately measure the strains of the rocket surface 102. As discussed previously, beam structures 20 are used as the medium to install sensors 30. However, beam structures 20 and sensor placement thereon must be optimized to achieve the most accurate estimation of the rocket deformation. The whole optimization of the beam-sensor structure includes two sub-problems. The first is the structural design optimization of beam structures 20 and the other is the optimization of the sensor spacing along the beams. As will be explained further below, the sensor systems of the present invention incorporate a novel optimization scheme.

The objective of optimization of beam structure 20 is to minimize the strain difference between rocket surface 102 and beam structures 20 so that the rocket deformation can be accurately measured by sensors 30 instrumented on beam structures 20. The performance of beam structures 20 depends on their dimensions and the radial spacing "r" between rocket surface 102 and beam structures 20, and longitudinal spacing "l" between longitudinally adjacent mounts 60. The two objective functions of the optimization are the root mean square (RMS) axial and shear strain differences between rocket body 100 and beam structures 20. Furthermore, attaching beam structures 20 to a structure introduces weight. For monitoring applications such as rockets, the weight issue should be minimized. For applications that are not concerned with weight issues, weight optimization can be omitted.

Beam structure optimization problem is defined as follows:

$$\min_{x_d} f_1(x_d) = \sqrt{\frac{1}{N}\sum_{n=1}^{N}(\varepsilon_{axial}^{structure} - \varepsilon_{axial}^{beam})^2}, \quad (11)$$

$$\min_{x_d} f_2(x_d) = \sqrt{\frac{1}{N}\sum_{n=1}^{N}(\varepsilon_{xy}^{structure} - \varepsilon_{xy}^{beam})^2},$$

$$\min_{x_d} f_3(x_d) = \rho h b$$

where $\varepsilon_{axial}^{structure}$ is the axial strain of the structure's surface (e.g., rocket surface 102), $\varepsilon_{axial}^{beam}$ is the axial strain of the beam, $\varepsilon_{xy}^{structure}$ is the shear strain of the structure's surface, and $\varepsilon_{xy}^{beam}$ is the shear strain of the beam, and $\rho$ is the density of the beam. The design variable $x_d=\{l,r,h,b\}^T$, includes the spacing "l" in the longitudinal direction, the radial spacing "r", beam cross-sectional thickness "h", and beam cross-sectional width "b".

The number and positioning of sensors 30 to be instrumented along beam structures 20 are based on an estimation of curvature and twist of a structure that is to be monitored. Since the kinematic equations described above interpolate the measured strain data to calculate the bending/torsional curvatures of the rocket's center axis 104, the choice of strain sensor spacing (i.e., the number of sensors on beam structure 20) influences the accuracy of the interpolation and the estimated bending/torsional curvatures. The number and positioning of sensors 30 can be optimized by minimizing the following objective functions of $$\min_{x_s} f_4(x_s) = \sqrt{\frac{1}{N}\sum_{n=1}^{N}(\kappa_x^{FEM} - \kappa_x^{EST})^2}, \quad (11)$$

$$\min_{x_s} f_5(x_s) = \sqrt{\frac{1}{N}\sum_{n=1}^{N}(\kappa_y^{FEM} - \kappa_y^{EST})^2},$$

$$\min_{x_s} f_6(x_s) = \sqrt{\frac{1}{N}\sum_{n=1}^{N}(\kappa_z^{FEM} - \kappa_z^{EST})^2},$$

$$\min_{x_s} f_7(x_s) = n_{sensor}$$

where the superscript "FEM" indicates (rocket) center axis curvature values directly derived from the finite-element simulation, while "EST" denotes the curvatures estimated by the measured strain data. The quantity $n_{sensor}$ is the number of sensors used on a beam structure 20. The sensor spacing $x_s$ assumes uniform spacing.

The advantages of the present invention are numerous. The described multi-axial sensor systems provide for the indirect monitoring of bending and torsion vibrations/deformations experienced by flexible structures such as buildings, bridges, crane booms, aircraft, rockets, etc. For cylindrical structures such as rockets, the use of three multi-axial sensor systems with 120° angular spacing provides accurate measurements of structure deformation. Errors associated with the indirect monitoring/measurement using the sensor systems are minimized by the present invention's optimizing scheme that governs the sensor system's beam structure and placement of the fiber optic strain sensors on the beam. The sensor systems can be attached to existing structures thereby simplifying their use, maintenance, and cost.

Although the invention has been described relative to a specific embodiment thereof, there are numerous variations and modifications that will be readily apparent to those skilled in the art in light of the above teachings. For example, the reference strain structures described herein could also be mounted directly onto a flexible structure's surface or machined into a surface region thereof without departing form the scope of the present invention. It is therefore to be understood that, within the scope of the appended claims, the invention may be practiced other than as specifically described.

What is claimed as new and desired to be secured by Letters Patent of the United States is:

1. A sensor system for sensing deformation of a flexible structure, comprising:
    a beam structure adapted to be coupled to a surface of a flexible structure, wherein the flexible structure has a natural frequency $f_s$, an axial strain $\varepsilon_{axial}^{structure}$, and a shear strain $\varepsilon_{xy}^{structure}$ associated therewith, said beam structure having an axial strain $\varepsilon_{axial}^{beam}$ and a shear strain $\varepsilon_{xy}^{beam}$ associated therewith, wherein said beam structure satisfies a criteria defined by minimization of a root mean square difference between $\varepsilon_{axial}^{structure}$ and $\varepsilon_{axial}^{beam}$ and minimization of a root mean square RMS difference between $\varepsilon_{xy}^{structure}$ and $\varepsilon_{xy}^{beam}$; and
    a plurality of fiber optic strain sensors coupled to and distributed in a spaced-apart fashion along said beam structure,
    said beam structure being more flexible than the flexible structure wherein a combination of said beam structure, said fiber optic sensors, and the flexible structure has a natural frequency $f_c$ defined by $(0.95)f_s \leq f_c \leq (1.05)f_s$.

2. A sensor system as in claim 1, wherein said beam structure is solid.

3. A sensor system as in claim 1, wherein said beam structure is hollow.

4. A sensor system as in claim 1, wherein said beam structure is rectangular in cross-section.

5. A sensor system as in claim 1, wherein said beam structure has a longitudinal axis, and wherein said sensors are arranged along at least one line that is parallel to said longitudinal axis.

6. A sensor system as in claim 1, wherein said beam structure has a longitudinal axis, wherein each of said sensors has a sensing axis, and wherein each said sensing axis is one of parallel to said longitudinal axis and oriented at an acute angle relative to said longitudinal axis.

7. A sensor system as in claim 1, wherein said beam structure has a longitudinal axis, wherein each of said sensors has a sensing axis, wherein said sensing axis associated with a portion of said sensors is parallel to said longitudinal axis, and wherein said sensing axis associated with a remainder of said sensors lies at an acute angle relative to said longitudinal axis.

8. A sensor system as in claim 7, wherein said portion of said sensors is interleaved with said remainder of said sensors.

9. A sensor system as in claim 1, wherein a number of said sensors and positions of said sensors on said beam structure are based on an estimation of bending curvature and twist of the structure.

10. A sensor system as in claim 1, wherein said beam structure comprises N longitudinally-extending planar faces, and wherein said plurality of fiber optic sensors are coupled to N−1 of said longitudinally-extending planar faces.

11. A sensor system as in claim 1, wherein said beam structure comprises a plurality of flat plates.

12. A sensor system for sensing deformation of a flexible cylindrical structure, comprising:
a plurality of beam structures, each of said beam structures adapted to be coupled to a surface of a flexible cylindrical structure, wherein the flexible structure has a natural frequency $f_s$, an axial strain $\varepsilon_{axial}^{structure}$, and a shear strain $\varepsilon_{xy}^{structure}$ associated therewith, each of said beam structures being more flexible than the cylindrical structure, each of said beam structures having an axial strain $\varepsilon_{axial}^{beam}$ and a shear strain $\varepsilon_{xy}^{beam}$ associated therewith, wherein each of said beam structures satisfies a criteria defined by minimization of a root mean square difference between $\varepsilon_{axial}^{structure}$ and $\varepsilon_{axial}^{beam}$ and minimization of a root mean square difference between $\varepsilon_{xy}^{structure}$ and $\varepsilon_{xy}^{beam}$, each of said beam structures having a beam axis that is parallel to a longitudinal axis of the cylindrical structure, said beam structures distributed evenly about a radial circumference of the cylindrical structure; and
a plurality of fiber optic strain sensors coupled to and distributed in a spaced-apart fashion along outside surfaces of each of said beam structures,
each of said beam structures being more flexible than the flexible cylindrical structure wherein a combination of said beam structures, said fiber optic sensors, and the flexible cylindrical structure has a natural frequency $f_c$ defined by $(0.95)f_s \leq f_c \leq (1.05) f_s$.

13. A sensor system as in claim 12, wherein each of said beam structures is solid.

14. A sensor system as in claim 12, wherein each of said beam structures is hollow.

15. A sensor system as in claim 12, wherein each of said beam structures is rectangular in cross-section.

16. A sensor system as in claim 12 wherein, for each of said beam structures, said sensors are arranged along at least one line that is parallel to said beam axis associated therewith.

17. A sensor system as in claim 12, wherein each of said sensors has a sensing axis, and wherein each said sensing axis is one of parallel to said beam axis associated with a corresponding one of said beam structures and oriented at an acute angle relative to said beam axis associated with said corresponding one of said beam structures.

18. A sensor system as in claim 12, wherein each of said sensors has a sensing axis and wherein, for at least one of said beams elements, said sensing axis associated with a portion of said sensors is parallel to said beam axis, and said sensing axis associated with a remainder of said sensors lies at an acute angle relative to said beam axis.

19. A sensor system as in claim 18, wherein said portion of said sensors is interleaved with said remainder of said sensors.

20. A sensor system as in claim 12, wherein a number of said sensors and positions of said sensors on each of said beam structures are based on an estimation of bending curvature and twist of the cylindrical structure.

21. A sensor system as in claim 12, wherein each of said beam structures comprises N planar faces extending parallel to said beam axis thereof, and wherein said plurality of fiber optic sensors are coupled to N−1 of said planar faces for each of said beam structures.

22. A sensor system as in claim 12, wherein each of said beam structures comprises a plurality of flat plates.

23. A sensor system for sensing deformation of a flexible structure, comprising:
at least one rigid mount adapted to be rigidly coupled to a surface of a flexible structure, wherein the flexible structure has a natural frequency $f_s$, an axial strain $\varepsilon_{axial}^{structure}$, and a shear strain $\varepsilon_{xy}^{structure}$ associated therewith;
a beam structure coupled to said at least one rigid mount wherein said beam structure is offset from the surface of the structure, said beam structure having an axial strain $\varepsilon_{axial}^{beam}$ and a shear strain $\varepsilon_{xy}^{beam}$ associated therewith, wherein said beam structure satisfies a criteria defined by minimization of a root mean square difference between $\varepsilon_{axial}^{structure}$ and $\varepsilon_{axial}^{beam}$ and minimization of a root mean square difference between $\varepsilon_{xy}^{structure}$ and $\varepsilon_{xy}^{beam}$; and
a plurality of fiber optic strain sensors coupled to and distributed in a spaced-apart fashion along outside surfaces of said beam structure,
said beam structure being more flexible than the flexible structure wherein a combination of said beam structure, said fiber optic sensors, and the flexible structure has a natural frequency $f_c$ defined by $(0.95)f_s \leq f_c \leq (1.05)f_s$.

24. A sensor system as in claim 23, wherein said beam structure is solid.

25. A sensor system as in claim 23, wherein said beam structure is hollow.

26. A sensor system as in claim 23, wherein said beam structure is rectangular in cross-section.

27. A sensor system as in claim 23, wherein said beam structure has a longitudinal axis, and wherein said sensors are arranged along at least one line that is parallel to said longitudinal axis.

28. A sensor system as in claim 23, wherein said beam structure has a longitudinal axis, wherein each of said sensors has a sensing axis, and wherein each said sensing axis is one of parallel to said longitudinal axis and oriented at an acute angle relative to said longitudinal axis.

29. A sensor system as in claim 23, wherein said beam structure has a longitudinal axis, wherein each of said sensors has a sensing axis, wherein said sensing axis associated with a portion of said sensors is parallel to said longitudinal axis, and wherein said sensing axis associated with a remainder of said sensors lies at an acute angle relative to said longitudinal axis.

30. A sensor system as in claim 29, wherein said portion of said sensors is interleaved with said remainder of said sensors.

31. A sensor system as in claim 23, wherein a number of said sensors and positions of said sensors on said beam structure are based on an estimation of bending curvature and twist of the structure.

32. A sensor system as in claim 23, wherein said beam structure comprises N longitudinally-extending planar faces, and wherein said plurality of fiber optic sensors are coupled to N−1 of said longitudinally-extending planar faces.

33. A sensor system as in claim 23, wherein said beam structure comprises a plurality of flat plates.

\* \* \* \* \*